United States Patent
Wu

(10) Patent No.: US 11,354,192 B2
(45) Date of Patent: Jun. 7, 2022

(54) DATA STORAGE DEVICES AND METHODS FOR FIRMWARE FAILURE PREVENTION

(71) Applicant: Silicon Motion, Inc., Jhubei (TW)

(72) Inventor: Po-Wei Wu, Keelung (TW)

(73) Assignee: SILICON MOTION, INC., Jhubei (TW)

( * ) Notice: Subject to any disclaimer, the term of this patent is extended or adjusted under 35 U.S.C. 154(b) by 460 days.

(21) Appl. No.: 16/671,364

(22) Filed: Nov. 1, 2019

(65) Prior Publication Data
US 2020/0226026 A1    Jul. 16, 2020

(30) Foreign Application Priority Data

Jan. 16, 2019    (TW) .................................. 108101611

(51) Int. Cl.
*G06F 11/14* (2006.01)
*G06F 11/36* (2006.01)
*G06F 9/4401* (2018.01)
*G06F 3/06* (2006.01)

(52) U.S. Cl.
CPC .......... *G06F 11/1417* (2013.01); *G06F 3/064* (2013.01); *G06F 3/0619* (2013.01); *G06F 3/0652* (2013.01); *G06F 3/0653* (2013.01); *G06F 3/0679* (2013.01); *G06F 9/4406* (2013.01); *G06F 11/362* (2013.01)

(58) Field of Classification Search
CPC .. G06F 11/362; G06F 11/1417; G06F 3/0619; G06F 3/064; G06F 3/0652; G06F 3/0653; G06F 3/0679; G06F 9/4406
See application file for complete search history.

(56) References Cited

U.S. PATENT DOCUMENTS

| | | | |
|---|---|---|---|
| 6,502,208 B1 * | 12/2002 | McLaughlin | ....... G06F 11/0772 714/39 |
| 9,158,476 B2 | 10/2015 | Lai et al. | |
| 9,690,488 B2 | 6/2017 | Gopal et al. | |
| 10,664,598 B1 * | 5/2020 | Righi | .................... G06F 21/572 |

(Continued)

FOREIGN PATENT DOCUMENTS

| TW | 201301133 A1 | 1/2013 |
|---|---|---|
| TW | I516936 B | 1/2016 |
| TW | I553481 B | 10/2016 |

*Primary Examiner* — Matthew M Kim
*Assistant Examiner* — Matthew N Putaraksa
(74) *Attorney, Agent, or Firm* — McClure, Qualey & Rodack, LLP

(57) ABSTRACT

A data storage device including a non-volatile memory and a micro-controller is provided. The non-volatile memory includes a first block and a second block, wherein the first block stores firmware code. The micro-controller writes one predetermined string into the second block before an execution of the firmware code, and determines whether there is more than one predetermined string in the second block. In response to there being no more than one predetermined string in the second block, the micro-controller allows the execution of the firmware code and erases the predetermined string in the second block upon successful completion of a prerequisite procedure during the execution of the firmware code. In response to there being more than one predetermined string in the second block, the micro-controller does not allow the execution of the firmware code.

14 Claims, 4 Drawing Sheets

(56) References Cited

U.S. PATENT DOCUMENTS

| | | | |
|---|---|---|---|
| 2007/0026716 A1* | 2/2007 | Zhang | H04L 25/40 |
| | | | 439/260 |
| 2008/0288769 A1* | 11/2008 | Shih | G06F 9/44505 |
| | | | 713/100 |
| 2013/0007724 A1 | 1/2013 | Lai et al. | |
| 2015/0149752 A1* | 5/2015 | Huang | G06F 9/4406 |
| | | | 713/2 |
| 2016/0316370 A1* | 10/2016 | Boyapalle | G06F 11/1417 |
| 2017/0090782 A1 | 3/2017 | Lee | |
| 2019/0012180 A1* | 1/2019 | Lai | G11C 16/20 |
| 2019/0163497 A1* | 5/2019 | Samuel | G06F 11/1469 |

* cited by examiner

DATA STORAGE DEVICES AND METHODS FOR FIRMWARE FAILURE PREVENTION

CROSS REFERENCE TO RELATED APPLICATIONS

This application claims priority of Taiwan Application No. 108101611, filed on Jan. 16, 2019, the entirety of which is incorporated by reference herein.

BACKGROUND OF THE APPLICATION

Field of the Application

The application relates generally to a data storage medium, and more particularly, to data storage devices and methods for firmware failure prevention.

Description of the Related Art

Due to advancements in computer technology, various mass storage devices have been developed, wherein memory is the most widely used type of storage medium of all. Memory can be categorized into two major types based on its physical characteristics: volatile memory and non-volatile memory. Volatile memory requires an active power source to function. When the power source goes off, the content of the volatile memory is lost. In contrast to the volatile memory, non-volatile memory can retain its content without power being applied, and the content can be accessed when power is applied.

Non-volatile memory is widely used in electronic devices, especially portable electronic devices (e.g., mobile phones, digital cameras, and handheld game consoles, etc.), for long-term data storage. Nowadays, there are various types of non-volatile memory available on the market, including flash memory, magneto-resistive Random Access Memory (RAM), ferroelectric RAM, resistive RAM, and Spin Transfer Torque (STT) RAM, etc.

The firmware of non-volatile memory is usually written during the manufacturing process, and after boot-up of the non-volatile memory, the firmware may be executed to enable the memory to handle data-access requests from the host. However, in certain situations where the firmware code has bugs, errors may occur in the prerequisite stage of the firmware execution, causing the firmware execution to crash (which is also called firmware failure) and causing the memory to be unable to service the host.

To cope with these situations, conventional designs rely on manual fabrication of memory, which requires wiring the signal outputs from inside the memory to the outside and connecting a particular signal output to ground, so that the firmware may not be executed after boot-up of the memory. Disadvantageously, such conventional designs are not conductive to mass production of memory due to the difficulty and inefficiency of manual fabrication.

Therefore, it is desirable to have a solution for data storage devices to prevent firmware failures.

BRIEF SUMMARY OF THE APPLICATION

The present application proposes a data storage device comprising a non-volatile memory and a micro-controller. The non-volatile memory comprises a first block and a second block, wherein the first block stores firmware code. The micro-controller is configured to write one predetermined string into the second block before an execution of the firmware code, and determine whether there is more than one predetermined string in the second block. In response to there being no more than one predetermined string in the second block, the micro-controller is further configured to allow the execution of the firmware code and erase the predetermined string in the second block upon successful completion of a prerequisite procedure during the execution of the firmware code. In response to there being more than one predetermined string in the second block, the micro-controller is further configured to not allow the execution of the firmware code.

In one embodiment, the prerequisite procedure comprises a link building procedure of the firmware code.

In one embodiment, the non-volatile memory is configured to store a boot code, and the micro-controller is further configured to load and execute the boot code from the non-volatile memory, wherein the writing of the predetermined string into the second block is performed in response to obtaining an address of where the firmware code is stored in the non-volatile memory during the execution of the boot code.

In one embodiment, the micro-controller is further configured to enter a ROM-code mode in response to there being more than one predetermined string in the second block.

In one embodiment, the micro-controller is further configured to determine whether to perform a debug procedure or not in response to there being more than one predetermined string in the second block, allow the execution of the firmware code in response to determining to perform the debug procedure, and not allow the execution of the firmware code in response to determining not to perform the debug procedure.

In one embodiment, the second block is an idle block.

In one embodiment, the writing of the predetermined string into the second block comprises: selecting one of a plurality of empty pages from the second block; and writing the predetermined string into the selected empty page.

The present application proposes a method for firmware failure prevention, which is executed by a micro-controller of a data storage device comprising a non-volatile memory. The method for firmware failure prevention comprises the steps of: before loading and executing firmware code from a first block of the non-volatile memory, writing one predetermined string into a second block of the non-volatile memory; determining whether there is more than one predetermined string in the second block; in response to there being no more than one predetermined string in the second block, allowing the execution of the firmware code and erasing the predetermined string in the second block upon successful completion of a prerequisite procedure during the execution of the firmware code; and in response to there being more than one predetermined string in the second block, not allowing the execution of the firmware code.

In one embodiment, the prerequisite procedure comprises a link building procedure of the firmware code.

In one embodiment, the method for firmware failure prevention further comprises the steps of: loading and executing boot code from the non-volatile memory, wherein the writing of the predetermined string into the second block is performed in response to obtaining an address of where the firmware code is stored in the non-volatile memory during the execution of the boot code.

In one embodiment, the method for firmware failure prevention further comprises the steps of: entering a ROM-code mode, in response to there being more than one predetermined string in the second block.

In one embodiment, the method for firmware failure prevention further comprises the steps of: determining whether to perform a debug procedure or not in response to there being more than one predetermined string in the second block; allowing the execution of the firmware code in response to determining to perform the debug procedure; and not allowing the execution of the firmware code in response to determining not to perform the debug procedure.

In one embodiment, the second block is an idle block.

In one embodiment, the writing of the predetermined string into the second block comprises: selecting one of a plurality of empty pages from the second block; and writing the predetermined string into the selected empty page.

Other aspects and features of the application will become apparent to those with ordinary skill in the art upon review of the following descriptions of specific embodiments of the data storage devices and methods for firmware failure prevention.

BRIEF DESCRIPTION OF THE DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
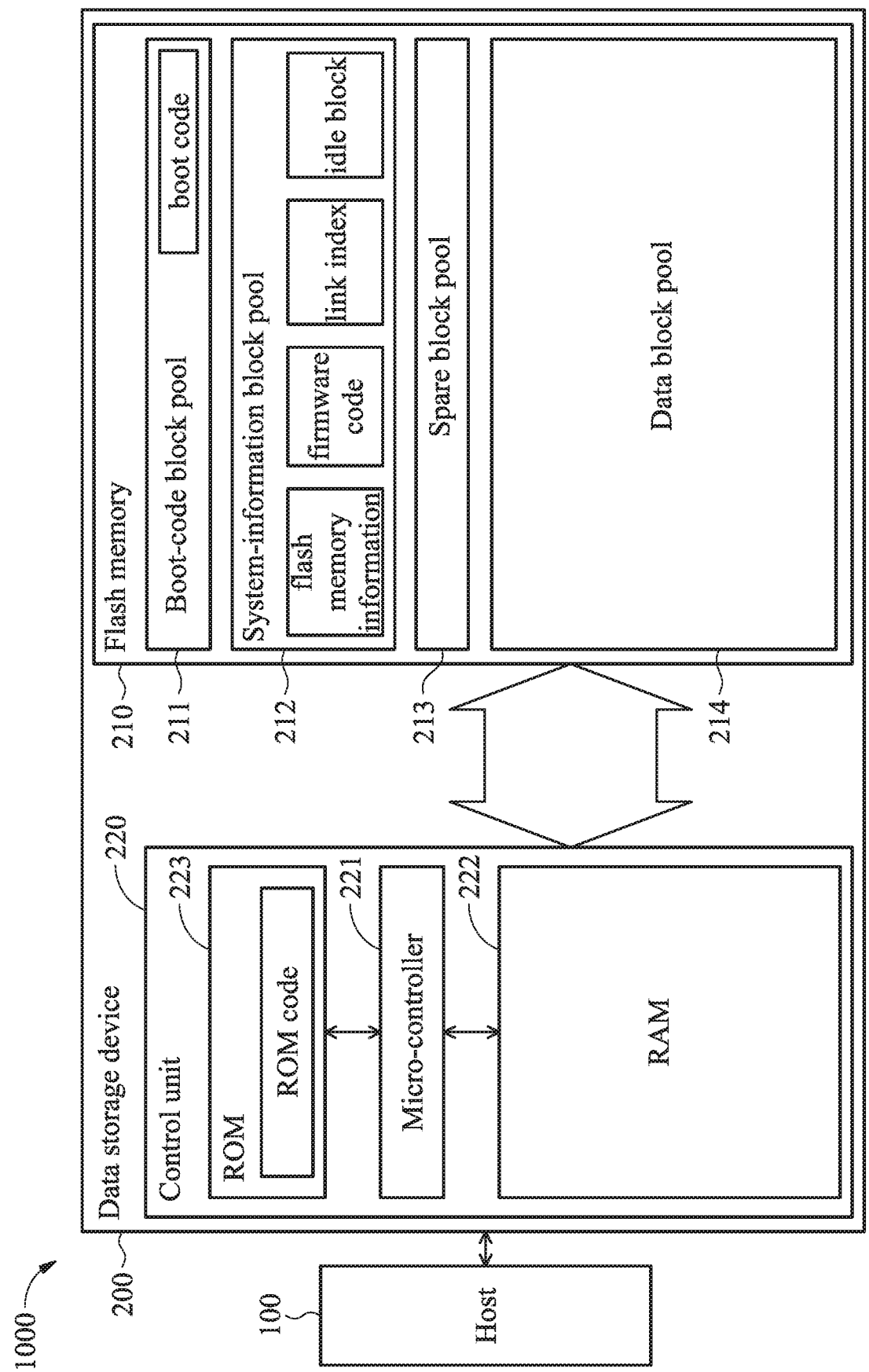
FIG. 1 is a block diagram illustrating an electronic apparatus according to an embodiment of the application.

FIG. 1 is a block diagram illustrating an electronic apparatus according to an embodiment of the application.

As shown in FIG. 1, the electronic apparatus 1000 includes a host 100 and a data storage device 200, wherein the host 100 may use a standardized protocol to communicate with the data storage device 200 for data reading and/or writing via an interface. For example, the standardized protocol may include at least the following interface protocol: Universal Serial Bus (USB), Secure Digital (SD), Ultra High Speed-I (UHS-I), Ultra High Speed-II (UHS-II), (Compact Flash (CF), Multimedia Card, (MMC), Embedded Multimedia Card (eMMC), Universal Flash Storage (UFS), Advanced Technology Attachment (ATA), Serial ATA (SATA), Peripheral Component Interconnect Express (PCI-E), Parallel Advanced Technology Attachment (PATA), etc.

The electronic apparatus 1000 may be a Personal Computer (PC), smartphone, wearable device, panel PC, Virtual Reality (VR) equipment, etc. Generally speaking, the Central Processing Unit (CPU) of such electronic apparatus may be referred to as the host 100 which operates the data storage device 200.

The data storage device 200 includes a flash memory 210 and a control unit 220, wherein the control unit 220 is coupled between the host 100 and the flash memory 210, and operates the flash memory 210 according to the instructions issued by the host 100. For example, the instructions may include SCSI Primary Commands (SPC), SCSI Block Commands (SBC), and Trim commands, etc.

The control unit 220 includes a micro-controller 221, a RAM 222, and a Read-Only Memory (ROM) 223. For example, if the data storage device 200 is an SD card, the RAM 222 may be a 512 KB Static RAM (SRAM).

The ROM 223 is used to store ROM code which may include boot loader code and initial code. The micro-controller 221 may load and execute the ROM code from the ROM 223, and the boot code and/or firmware code from the flash memory 210, to perform various operations which may use the RAM 222 as a dynamic data buffer. For example, the micro-controller 221 may load and execute the initial code for initialization of the flash memory 210 and register(s) (not shown). In addition, the micro-controller 221 may load and execute the boot loader code for using a predetermined search rule to retrieve the boot code from the flash memory 210. The boot code and the firmware code may be written into a boot-code block pool 211 and a system-information block pool 212, respectively, during the open-card process of the data storage device 200. In particular, the micro-controller 221 is also responsible for performing the method for firmware failure prevention.

Specifically, the flash memory 210 includes a boot-code block pool 211, a system-information block pool 212, a spare block pool 213, and a data block pool 214.

The blocks in the system-information block pool 212 may be used to store system information, including flash memory information, firmware code, and link index. The flash memory information may include some basic information, such as the number of planes, the number of blocks, and the size of each page, etc., of the flash memory. The firmware code may be program code used for controlling the operations of the flash memory 210. The link index may be used to keep the address of a root table stored in the flash memory 210. The root table may store the addresses of various tables, including a table keeping average wear levels of each block, a table keeping the number of valid physical pages of each block, a Host-to-Flash (H2F) mapping table, and a respective Flash-to-Host (F2H) mapping table of each block. By using the root table, the micro-controller 221 may be able to access these tables when it needs to operate the flash memory 210.

Each of the flash memory information, the firmware code, and the link index may be written into a respective block in the system-information block pool 212 during the open-card process of the data storage device 200. In addition, the system-information block pool 212 may include an idle block for block swapping. Specifically, block swapping refers to using the idle block to replace any block that is full and needs to be updated, wherein the content of the replaced block may be erased during the garbage collection process and re-allocated as an idle block in the system-information block pool 212.

The blocks in the spare block pool 213 may be allocated by the micro-controller 221 to store data. For example, the blocks in the spare block pool 213 may serve as active blocks (or called buffer blocks) storing data received from the host 100, or serve as destination blocks for the garbage collection process. Once a block in the spare block pool 213 has finished the data storing (i.e., the block is full or suspended), it may be re-allocated as a data block in the data block pool 214.

It should be understood that the data storage device described in the embodiment of FIG. 1 is for illustrative purposes only and is not intended to limit the scope of the application. For example, the data storage device 200 may include another type of non-volatile memory different from the flash memory, such as a magneto-resistive RAM, ferro-electric RAM, resistive RAM, or STT RAM, etc., as long as the layout of the adopted memory is applicable to the method for firmware failure prevention.

Figure 2:
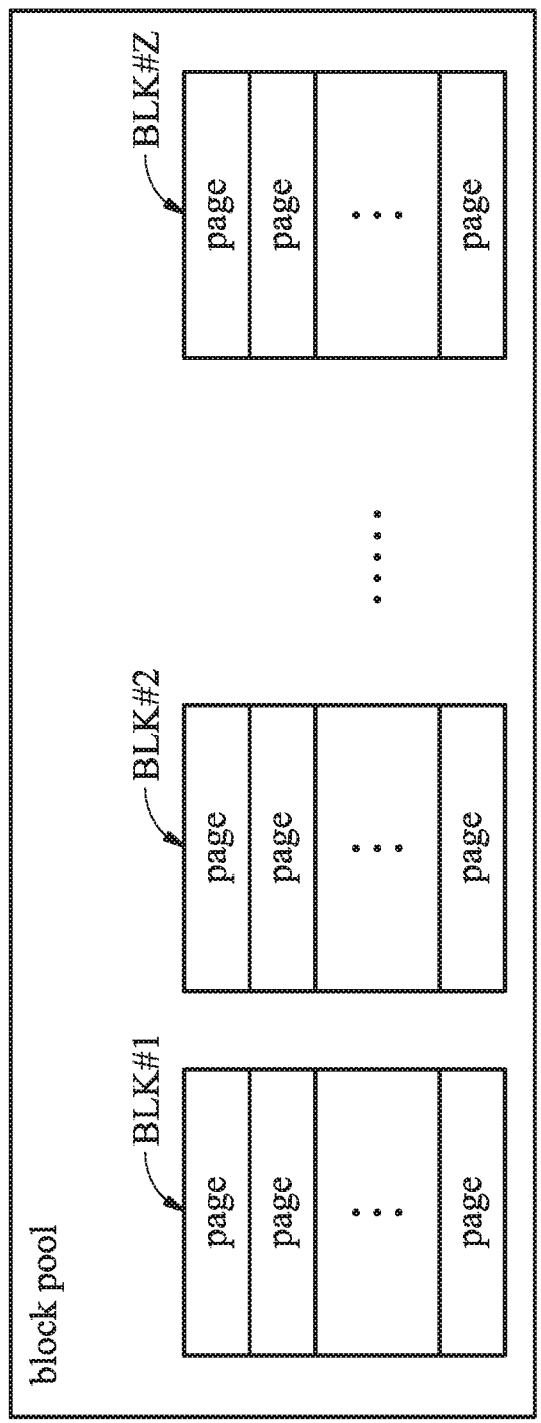
FIG. 2 is a schematic diagram illustrating the physical layout of an exemplary block pool according to an embodiment of the application.

FIG. 2 is a schematic diagram illustrating the physical layout of an exemplary block pool according to an embodiment of the application.

As shown in FIG. 2, the storage space of a block pool (e.g., the boot-code block pool 211, the system-information block pool 212, the spare block pool 213, or the data block pool 214) may be divided into a plurality of blocks (or called physical blocks) BLK #1, BLK #2, ... BLK #Z, wherein Z is a positive integer. Each physical block may include a plurality of pages (or called physical pages). For example, there may be 256 physical pages in each physical block.

Taking the system-information block pool 212 as an example, it may include at least 4 blocks, wherein the first 3 blocks are used to store the flash memory information, firmware code, and link index, respectively, while the last block may be configured as an idle block. In one embodiment, the idle block in the system-information block pool 212 may be used to store a predetermined string written by the host 100, wherein the predetermined string is used in the method for firmware failure prevention, and the details regarding the usage of the predetermined string in the method for firmware failure prevention will be described later.

Figure 3:
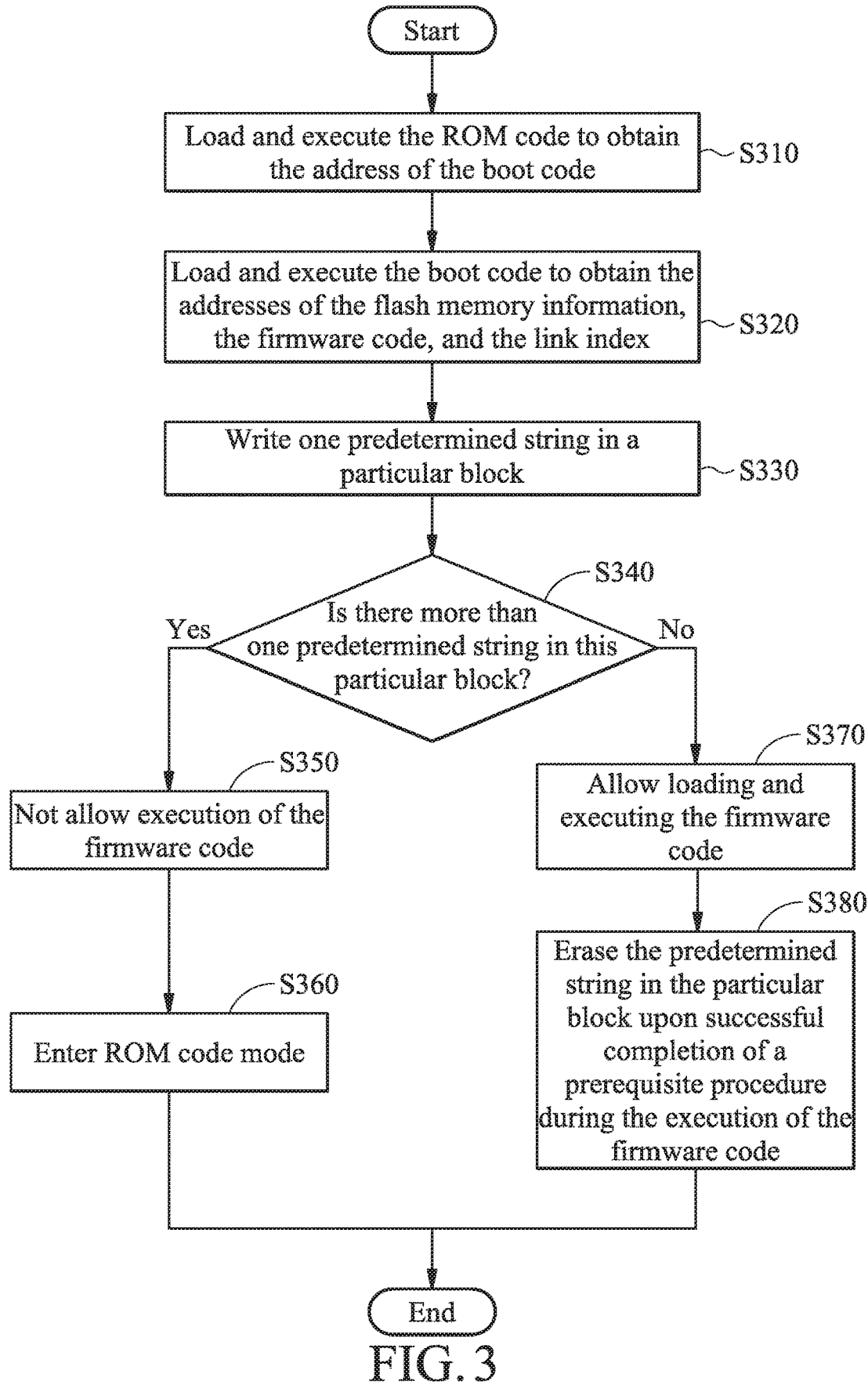
FIG. 3 is a flow chart illustrating the method for firmware failure prevention according to an embodiment of the application.

FIG. 3 is a flow chart illustrating the method for firmware failure prevention according to an embodiment of the application.

In this embodiment, the method for firmware failure prevention is applied to a data storage device (e.g., the data storage device 200) including a non-volatile memory, and executed by a micro-controller (e.g., the micro-controller 221) of the data storage device. In particular, the method for firmware failure prevention may be implemented in the form of program code, such as ROM code, boot code, firmware code, or any combination of the above.

To begin with, the micro-controller 221 loads and executes the ROM code from the ROM 223 to obtain the address of the boot code (step S310), and then loads and executes the boot code from the boot-code block pool 211 to obtain the addresses of the flash memory information, the firmware code, and the link index (step S320).

Subsequent to step S320, the micro-controller 221 writes one predetermined string (e.g., "POWER ON") in a particular block during the execution of the boot code (step S330). Specifically, the micro-controller 221 may select one of the plurality of pages in this particular block, and writes the predetermined string in the selected page. For example, the micro-controller 221 may select the page from page #0 to page #n−1 in sequence. That is, if page #0 is already written, the page selection may proceed to page #1, and if page #1 is empty (i.e., not written), the micro-controller 221 may select page #1 to write the predetermined string.

In one embodiment, this particular block may be the idle block in the system-information block pool 212. In another embodiment, this particular block may be any block in any block pool, as long as the address of this particular block is kept in the boot code.

Subsequent to step S330, the micro-controller 221 determines whether there is more than one predetermined string in this particular block (step S340). Specifically, the micro-controller 221 may start from page #0 to check if each page in this particular block is written with the predetermined string, and determine that there is more than one predetermined string in this particular block if two or more pages in this particular block are written with the same predetermined string. Otherwise, if only one page in this particular block is written with the predetermined string, the micro-controller 221 may determine that there is no more than one predetermined string in this particular block.

Subsequent to step S340, if there is more than one predetermined string in this particular block, the micro-controller 221 does not allow execution of the firmware code (step S350) and enters the ROM code mode (step S360), and the method ends. Specifically, the ROM code mode may refer to a mode in which the micro-controller 221 loads and executes the ROM code. That is, in the ROM code mode, the micro-controller 221 may initialize the flash memory 210 and the register(s) (not shown), and use the boot loader code to locate the boot code. When executing the boot code, the micro-controller 221 leaves the ROM code mode. In step S360, the micro-controller 221 just stays in the ROM code mode and uses the boot loader code to locate the boot code, but does not execute the boot code.

Subsequent to step S340, if there is no more than one predetermined string in this particular block, the micro-controller 221 allows loading and executing the firmware code from the system-information block pool 212 (step S370). Next, the micro-controller 221 erases the predetermined string in the particular block upon successful completion a prerequisite procedure during the execution of the firmware code (step S380), and the method ends.

In one embodiment, the prerequisite procedure may include a link building procedure of the firmware code, which is responsible for building the links between host data and every storage unit (e.g., a plane, a block, or a page) of the non-volatile memory according to the link index. In other words, the link building procedure may include retrieving the link index from the system-information block pool 212, and using to link index to load the tables required for operating the flash memory 210, so as to enable the micro-controller 221 to locate any host data (e.g., finding the plane/block/page where the desired host data is located).

It should be noted that, during the method flow, if the firmware code has bugs, the firmware execution may fail (or called firmware failure), for example, in the prerequisite procedure, causing the predetermined string to remain in the particular block. After that, when the data storage device 200 is restarted and the method for firmware failure prevention is performed again, the method flow subsequent to step S340 will always take the "Yes" branch. Advantageously, the firmware code with bugs will not be executed, and thus, firmware failure may be avoided.

In another embodiment, subsequent to step S340, if there is more than one predetermined string in this particular block, the micro-controller 221 may first determine whether to perform a debug procedure or not. If determining not to perform a debug procedure, the method proceeds to step S350. Otherwise, if determining to perform a debug procedure, the method proceeds to step S370 to allow the execution of the firmware code, so that the debug procedure may be performed during the execution of the firmware code.

Figure 4:
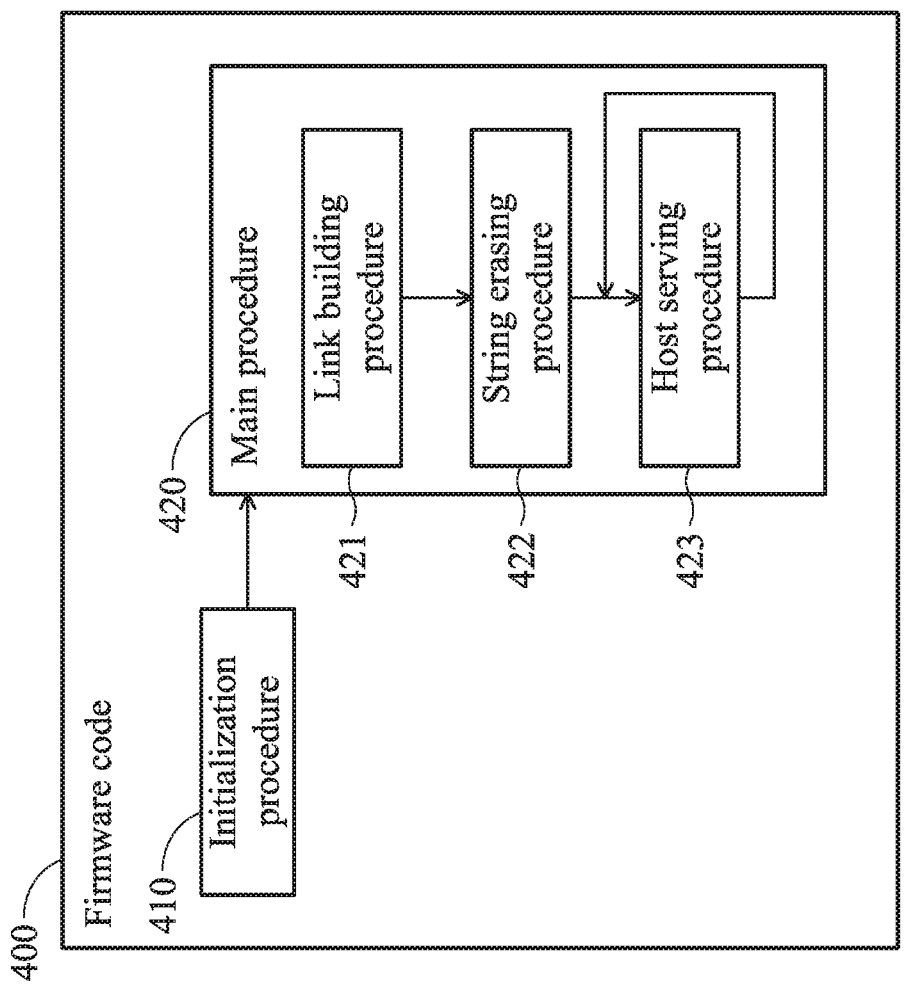
FIG. 4 is a schematic diagram illustrating the execution of the firmware code according to an embodiment of the application.

FIG. 4 is a schematic diagram illustrating the execution of the firmware code according to an embodiment of the application.

As shown in FIG. 4, the firmware code 400 at least includes an initialization procedure 410 and a main procedure 420. The initialization procedure 410 is responsible for preparing the parameters required for executing the firmware code 400 according to the flash memory information stored in the system-information block pool 212. When the initialization procedure 410 is successfully completed, the main procedure 420 is performed.

The main procedure 420 includes a link building procedure 421, a string erasing procedure 422, and a host serving procedure 423. The initialization procedure 410 and/or the link building procedure 421 may be considered as the prerequisite procedure of the firmware code 400.

The link building procedure 421 is responsible for using the parameters prepared by the initialization procedure 410 to build the links between the host data and every storage unit (e.g., plane/block/page) of the flash memory. The string erasing procedure 422 is responsible for erasing the predetermined string in a certain block after the link building procedure 421 is successfully completed. The host serving procedure 423 is responsible for waiting for and executing instructions (e.g., read, write, or reset) issued by the host.

In view of the forgoing embodiments, it will be appreciated that the present application realizes firmware failure prevention, by writing one predetermined string in a particular block during the execution of the boot code, allowing or not allowing the execution of the firmware code according to whether there is more than one predetermined string in the particular block, and erasing the predetermined string only when the prerequisite procedure of the firmware code is successfully completed. By doing so, if the execution of the firmware code has failed once, the firmware code with bugs will not be executed after the data storage device is restarted, and thus, firmware failure may be avoided.

While the application has been described by way of example and in terms of preferred embodiment, it should be understood that the application cannot be limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A data storage device, comprising:
    a non-volatile memory, comprising a first block and a second block, wherein the first block stores firmware code; and
    a micro-controller, configured to:
        write one predetermined string into the second block before an execution of the firmware code;
        determine whether there is more than one predetermined string in the second block;
        in response to there being no more than one predetermined string in the second block, allow the execution of the firmware code and erase the predetermined string in the second block upon successful completion of a prerequisite procedure during the execution of the firmware code; and
        in response to there being more than one predetermined string in the second block, not allow the execution of the firmware code.

2. The data storage device as claimed in claim 1, wherein the prerequisite procedure comprises a link building procedure of the firmware code.

3. The data storage device as claimed in claim 1, wherein the non-volatile memory is configured to store a boot code, and the micro-controller is further configured to load and execute the boot code from the non-volatile memory, and the writing of the predetermined string into the second block is performed in response to obtaining an address of where the firmware code is stored in the non-volatile memory during the execution of the boot code.

4. The data storage device as claimed in claim 1, wherein the micro-controller is further configured to enter a ROM-code mode in response to there being more than one predetermined string in the second block.

5. The data storage device as claimed in claim 1, wherein the micro-controller is further configured to determine whether to perform a debug procedure or not in response to there being more than one predetermined string in the second block, allow the execution of the firmware code in response to determining to perform the debug procedure, and not allow the execution of the firmware code in response to determining not to perform the debug procedure.

6. The data storage device as claimed in claim 1, wherein the second block is an idle block.

7. The data storage device as claimed in claim 1, wherein the writing of the predetermined string into the second block comprises:
    selecting one of a plurality of empty pages from the second block; and
    writing the predetermined string into the selected empty page.

8. A method for firmware failure prevention, executed by a micro-controller of a data storage device comprising a non-volatile memory, the method comprising:
    before loading and executing firmware code from a first block of the non-volatile memory, writing one predetermined string into a second block of the non-volatile memory;
    determining whether there is more than one predetermined string in the second block;
    in response to there being no more than one predetermined string in the second block, allowing the execution of the firmware code and erasing the predetermined string in the second block upon successful completion of a prerequisite procedure during the execution of the firmware code; and
    in response to there being more than one predetermined string in the second block, not allowing the execution of the firmware code.

9. The method as claimed in claim 8, wherein the prerequisite procedure comprises a link building procedure of the firmware code.

10. The method as claimed in claim 8, further comprising:
    loading and executing boot code from the non-volatile memory;
    wherein the writing of the predetermined string into the second block is performed in response to obtaining an address of where the firmware code is stored in the non-volatile memory during the execution of the boot code.

11. The method as claimed in claim 8, further comprising:
entering a ROM-code mode, in response to there being more than one predetermined string in the second block.

12. The method as claimed in claim 8, further comprising:
determining whether to perform a debug procedure or not in response to there being more than one predetermined string in the second block;
allowing the execution of the firmware code in response to determining to perform the debug procedure; and
not allowing the execution of the firmware code in response to determining not to perform the debug procedure.

13. The method as claimed in claim 8, wherein the second block is an idle block.

14. The method as claimed in claim 8, wherein the writing of the predetermined string into the second block comprises:
selecting one of a plurality of empty pages from the second block; and
writing the predetermined string into the selected empty page.

\* \* \* \* \*